United States Patent [19]

Steen

[11] 4,174,223

[45] Nov. 13, 1979

[54] FLAME RETARDANT COMPOSITIONS AND METHODS OF PREPARING AND USING SAME

[76] Inventor: Donald M. Steen, P.O. Box 295, Morrill, Nebr. 69358

[21] Appl. No.: 915,156

[22] Filed: Jun. 13, 1978

[51] Int. Cl.$^2$ .............................................. C09K 3/28
[52] U.S. Cl. .............................. 106/18.16; 106/18.17; 252/8.1; 252/62; 427/212; 427/421; 427/430 R; 427/439; 427/440
[58] Field of Search ............... 106/18.16, 18.17, 18.21; 252/8.1, 62; 427/256, 288, 421, 439, 440, 212, 430 R; 428/264, 537, 541, 543, 921

[56] References Cited

U.S. PATENT DOCUMENTS

| | | | |
|---|---|---|---|
| 4,107,373 | 8/1978 | Miller | 252/8.1 |
| 4,126,473 | 11/1978 | Sobolev et al. | 252/8.1 |

FOREIGN PATENT DOCUMENTS

2281970 12/1976 France ........................................ 252/8.1

Primary Examiner—Leland A. Sebastian

[57] ABSTRACT

Various combustible materials such as paper, wood, leather, cloth and textiles of animal or vegetable origin and, especially, cellulosic materials suitable for insulation may be rendered fire retardant by treating the same with an aqueous solution comprising about 10 to 60 per cent of a blend of ammonium nitrate liquor and urea liquor, this blend can be within a range of 44.5% ammonium nitrate, 35.4% urea, and 20.3% water to 39.5% ammonium nitrate, 30.5% urea, and 30% water; about 10 to 50 per cent of an ammoniated poly phosphate having approximately 10 per cent nitrogen and approximately 34 per cent phosphoric acid; about 0 to 25 per cent molasses, starch or sugar or mixtures thereof; and up to about 3 per cent of a strong base such as sodium hydroxide.

11 Claims, No Drawings

FLAME RETARDANT COMPOSITIONS AND METHODS OF PREPARING AND USING SAME

BACKGROUND OF THE INVENTION

This invention relates generally to flame retardant compositions for application to combustible materials, for example, in the form of fibers, yarns, fabrics, papers, films and other structures. More particularly, the invention relates to compositions for rendering flame retardant various materials such as paper, wood, leather, cloth or textiles of animal or vegetable origin and, especially cellulosic materials such as shredded wood fiber, straw, cotton batting and ground waste paper insulation. Even more particularly, this invention relates to aqueous compositions comprising ammonium nitrate, urea and ammoniated poly phosphate, and optionally, a strong base, and molasses, sugar or starch or mixtures thereof which, when incorporated into combustible materials, significantly retards flaming and after-glow.

It is known in the art to incorporate various compounds and compositions into cellulosic products such as cloth or paper products, either during the fabrication of the products or by application as a coating in order to provide fire retarding properties. For example, U.S. Pat. No. 3,202,567 to Murray et al, discloses an emulsion coating comprising polyacrylate, polyvinyl chloride, chlorinated paraffin, antimony oxide and titanium dioxide. Another patent, U.S. Pat. No. 2,416,447 to Laughlin et al, discloses the use of a composition comprising antimony trioxide and chlorine containing organic compounds to flame proof paper. Still other patents, for example, U.S. Pat. No. 2,935,471 to Aarons et al and U.S. Pat. No. 3,819,518 to Endler disclose the use of urea, various boron-containing compounds, and various ammonium salts of inorganic acids for rendering cellulosic materials flame retardant.

While flame retardant compositions of the above type generally have been found to be effective, they have not been entirely satisfactory for a number of reasons. For example, many of the compositions have been too expensive for large volume use, whereas others have been found to be too corrosive for certain applications. Still others give off obnoxious odors or are too short-lived for many applications.

Accordingly, it is an object of the present invention to provide the economical production of effective flame retardant compositions for use in conjunction with a variety of combustible products in various structural forms.

It is another object to provide non-corrosive aqueous compositions which are useful flame retardants for a variety of combustible products, especially cellulosic insulation products.

Yet another object is the preparation of long-lived, aqueous flame retardant compositions which are useful for rendering flame retardant combustible materials including paper, wood, leather, cloth, textiles of animal or vegetable origin, and cellulose materials used for insulation.

The above and other objects and advantages have been accomplished in accordance with this invention, wherein combustible materials are made substantially flame retardant without unduly increasing the heat sensitivity of the treated material by treating the combustible material with an aqueous solution consisting essentially of a blend of an aqueous ammonium nitrate liquor and an aqueous urea liquor and an aqueous ammoniated polyphosphate solution. In addition, it is desirable to add a strong base in an amount sufficient to adjust the pH of the composition to about 6-8 to reduce any corrosive characteristics thereof. Optionally, the flame retardant compositions also may contain a minor amount of molasses, starch or sugar or mixtures thereof, and/or a wetting agent or surfactant in order to promote the desired degree of wettability, it being understood that the wetting agent serves only in its conventional manner and is in no way synergistic with the other components of the subject flame retardant compositions. As already indicated the surfactant is not an essential component of the flame retardant composition and needs only to be used where necessary to increase the speed of penetration or wetting action of the treating solution.

When a surfactant is present in the fire retardant composition, it is normally present in very small amounts (less than 1%). It is generally preferred to use about 0.5 part of surfactant per 99.5 parts of total flame retardant. However, more or less surfactant may be employed depending upon the efficiency of the surfactant as a wetting agent and the degree of wetting required. In the amounts present in the compositions of the invention, the wetting agent (surfactant) cannot and does no affect the flammability or discoloration tendencies or the other physical properties of the treatment on the substrate.

Typical of the wetting agents which can be employed are the sodium salt of an alkyl aryl sulfonate in which the alkyl group is derived from kerosene (a hydrocarbon mixture boiling 150°–250° C.) and the aryl group is phenyl, and the sodium salt of saturated hydrocarbon sulfonates.

It will be understood, of course, that other conventional additives may be incorporated in the subject flame retardant compositions so long as they are compatible with the essential components and do not effect adversely the flame retarding properties thereof. Thus, the subject compositions may include minor amounts of coloring agents, odor modifying agents, thickeners, glue, and the like.

It has been found the liquid fire retardant is compatible with many other powder forms of fire retardants, such as Borax, Boric Acid, Aluminum Sulfate, Aluminum Hydrate, Chlorinated Paraffins and many other commercial formulas that are expensive, and can be used in many combinations. The combination of the present liquid formula with other known fire retardants does not detract from its advantages, but enhances, in some instances, the resulting cellulose insulation. As used herein, and in commerce generally, the term cellulose insulation is meant to describe a loose fill insulation. It normally is manufactured by grinding a cellulose product through a hammermill or hammermills and treating the ground product with a suitable fire retardant.

In most cases the use of the present liquid either with dry chemicals or by itself, will give superior results as a fire retardant and produce a superior insulation as well as reduce dust in the final insulation, cut labor, material, and handling costs, and reduce warehouse area needed for chemical storage.

The relative amounts of the various components of the subject compositions may vary over reasonably wide limits. For example, the blend of ammonium nitrate liquor and urea liquor may comprise from about 10 to about 60 percent of the total composition (all percentages referred to herein being by weight unless noted otherwise), the ammoniated poly phosphate may comprise from about 10 to 50 percent of the total composition, the molasses, starch or sugar or mixture thereof may comprise from 0 to about 25 percent of the total composition, and the strong base may comprise up to about 3 percent of the composition, as required for pH adjustment. Generally, any conventional additives will be used in a combined amount not to exceed about 3 percent.

The blend of ammonium nitrate liquor and urea liquor used for preparing the subject compositions comprises from about 44.5% to about 39.5% ammonium nitrate, from about 35.4% to about 30.5% urea, and from about 20.3% to about 30% water; and normally will comprise approximately 40-60% of the total nitrogen from each of said ammonium nitrate and urea and a total of from about 28% to about 32% nitrogen. Such blends are commercial products and may be obtained, for example, under the name Golden Uran from Allied Chemical Corporation. Thus, Uran 28 is representative of a relatively lower level nitrogen product, whereas Uran 32 is representative of a relatively higher level nitrogen product which may be used as the ammonium nitrate liquor and urea liquor blend.

The subject compositions may be prepared by adding to the above blend of the ammonium nitrate liquor and urea liquor, an ammoniated polyphosphate containing approximately 8%-12%, and preferably about 10% nitrogen and approximately 30%-40%, and preferably about 34% phosphoric acid. Such ammoniated polyphosphate is a commercial product and all manufactures in the fertilizer trade recognize 10-34-0 as being such an ammoniated polyphosphate. Next, the molasses, starch, or sugar or any other convention material is added with thorough mixing, whereafter the strong base such as sodium hydroxide or potassium hydroxide is added slowly while the composition is mixed thoroughly. As indicated above, the strong base is added to raise the pH of the composition to about 6-8, preferably about 7, to eliminate the corrosiveness of the final composition.

Typical of the combustible materials which can be rendered flame retardant by treatment with compositions of the invention are cellulosic materials, such as for instance, wood, wood fiber, straw, sawdust, wood flour, paper, viscose rayon, cotton fibers, and cotton textiles. Other materials which can be rendered flame retardant by the practice of our invention include naturally occurring fibrous materials, for example, wool and silk and such synthetic polymeric compounds as for instance polyvinyl acetate and polyvinyl alcohol cast from latices or solutions in the form of films or fibers.

Some of the compositions of our inventions, particularly those containing small amounts of sugar, molasses, starch or mixtures thereof have found special utility in improving the flame retardant characteristics of cellulose insulation materials, particularly loose fill cellulose materials.

In treating combustible materials with the compositions of this invention, no special techniques are required. For example, the materials may be treated by dipping, spraying, blending, and the like. Accordingly, the most appropriate application technique is a matter of choice to one skilled in the art depending upon the particular combustible material being treated, although it has been found that for use in conjunction with cellulose insulation, introducing the liquid in to the final grind of the cellulose insulation, at which point it is dispersed throughout the final insulation product, is preferred.

The amount of the fire retardant composition of this invention which is incorporated into the combustible material to provide fire retarding properties generally will be from about 5 to about 40 percent, based on the combined weight of the flame retardant and the combustible material. Preferably, from about 10 to 35 percent will be used, although the actual weight percent of the composition incorporated into the material will depend often upon the type of product being produced and the method of production. Generally, about 15 to 35 weight percent of the fire retardant composition of the present invention is incorporated into ground cellulose insulation products, such as ground newsprint, shredded wood fiber, straw, cotton batting and the like.

The invention will now be further described with reference to the following specific examples where are merely illustrative:

EXAMPLE 1

59 parts, by weight, of the nitrogen solution, comprised of 39.5% ammonium nitrate, 30.5% urea and 30% eater, was introduced into the mixer. To this was added 35 parts, by weight, of the ammoniated polyphosphate solution, composed of 10% ammonium nitroges and 34% phosphoric acid ($P_2O_5$). Next, 5 parts, by weight, of cane molasses was added to the mixture. After these three ingredients were introduced into the mixer, the resulting product was agitated until well mixed. At this point, approximately 1 part, by weight, of sodium hydroxide was added slowly as the product was recirculated, to adjust the pH of the composition to 7.

The final composition is as follows:

|  | Per Cent by Weight |
|---|---|
| A blend of ammonium nitrate liquor and urea liquor to contain approximately 28% nitrogen. | 59+ |
| Ammoniated poly phosphate containing approximately 10% nitrogen and 34% phosphoric acid. | 35 |
| Cane Molasses | 5 |
| Sodium Hydroxide or strong base | 1 |

EXAMPLE 2-4

The effectiveness of the compositions of this invention was tested in accordance with several standard testing methods. For each of the tests, mixed paper consisting of approximately 10% magazines, 15% cardboard, and 75% newsprint was introduced into a 60 h.p. shredder which reduced the material to particles of a size of a dollar bill or less. This material was blown into a surge bin. Said surge bin is a steel box with a chain drag floow which chain drag fed the material at a predetermined rate to an auger feeder. The auger feeder fed the chopped paper into a hammermill. This paper is fed into the hammermill at a rate of 76 parts by weight of the finished material. The fire retardant prepared in accordance with Example 1 is sprayed into the hammermill at the rate of 24 parts by weight of the finished material.

The first retardant chemical is stored in a 10,000 gallon tank. From this tank it is pumped by a positive displacement pump through a pressure regulating valve and a flow meter into lines running into the hammermill. At the hammermill, the liquid fire retardant flows through nozzles and is sprayed on the ground paper as it leaves the screen of the hammermill in a finished condition.

The finished insulation flows from the hammermill to a fan which blows the material, through a dust separating cyclone, and into the bagging bin. At this point the finished insulation is bagged. The flame spread classification, smoke and fuel contribution (Examples 2 and 3) of samples of the above insulation were tested to determine conformance with Federal Specification HH-1-515C. In Example 2, tests conducted by Factory Mutual Research were conducted as ASTM E-84-76A exploratory tests. The results of these tests are set forth in Table 1. In Example 3, tests conducted by United States Testing Company, Inc., for flame spread classification, smoke and fuel contributed were conducted in accordance with ASTM Designation E-84 "Standard Method of Test for Surface Burning Characteristics of Building Material". In addition, they tested, in Example 3, Flame Resistance Permanency Tests in accordance with ASTM Designation C-739 "Standard Specification for Cellulosic Fiber (wood base) Loose-Fill Insulation". The results of these tests are set forth in Table 2.

In addition, the apparent thermal conductivity, corrosiveness, moisture absorbtion, starch content, and odor emission were tested by Dynatech (Example 4). Apparent thermal conductivity was tested in accordance with ASTM C-177, "Thermal Conductivity of Materials by Means of the Guarded Hot Plate". Corrosiveness was determined in accordance with ASTM C-739, 10.7, "Cellulosic Fiber (wood base) Loose-Fill Thermal Insulation." Moisture absorption was determined in accordance with ASTM C-739 "Specification for Cellulosic Fiber (wood base) Loose-Fill Thermal Insulation". Starch content was determined in accordance with ASTM D-591, "Starch in Paper". The odor emission was determined in accordance with ASTM C-73, "Specification for Cellulosic Fiber (wood base) Loose-Fill Thermal Insulation". The results of these tests are set forth in Table 3.

TABLE 1

Results of ASTM E-84-76A exploratory test runs by Factory Mutual Research on three cellulose insulation samples (Example 2)

| Run 1 | | |
|---|---|---|
| Flame Spread | 5 | |
| Fuel Contributed | 0 | |
| Smoke Developed | 20 | |
| Observations | 0:40 | Ignition |
| | 1:08 | Maximum Flame Spread |
| | 10:00 | Burning to 6 feet (2 m) |
| Run 2 | | |
| Flame Spread | 15 | |
| Fuel Contributed | 0 | |
| Smoke Developed | 35 | |
| Observations | 1:11 | Ignition |
| | 3:20 | Maximum Flame Spread |
| | 10:00 | Burning to 6 feet (2 m) |
| Run 3 | | |
| Flame Spread | 15 | |
| Fuel Contributed | 0 | |
| Smoke Developed | 30 | |
| Observations | 0:55 | Ignition |
| | 4:10 | Maximum Flame Spread |
| | 10:00 | Burning to 6 feet (2 m) |

TABLE 2

Results of ASTM E-84 and ASTM C-739 exploratory test runs by United States Testing Company on cellulose insulation samples (Example 3)

| | |
|---|---|
| Flame Spread | 10 |
| Fuel Contribution | 0 |
| Smoke Density | 20 |
| Char Length, in. | |
| Orig. Cond. | 3.1 |
| Aged | 3.2 |
| Heat Generation, °F. | |
| Orig. Cond. | 104 |
| Aged | 119 |

TABLE 3

Results of apparent thermal conductivity, corrosiveness, moisture absorption, starch content and odor emission test runs by Dynatech (Example 4)

| | | |
|---|---|---|
| Apparent Thermal Conductivity 20° C. and 2.2 lbs ft$^{-3}$ Density | 0.27 Btu in h$^{-1}$ft$^{-2}$degF$^{-1}$ 0.039 W m$^{-1}$degK$^{-1}$ | |
| Thermal Resistance per inch 20° C. and 2.2 lbs ft$^{-3}$ Density | 3.7 Btu$^{-1}$h ft$^2$degF | |
| Starch Content | Negative | |
| Odor Emission | Slight trace only | |
| Moisture Absorption | 10.5% | |
| Corrosiveness | Negative | |
| | Steel coupon | extensively discolored |
| | Copper coupon | extensively discolored |
| | Aluminum coupon | slight discoloration only |
| | Steel control | appears to be undamaged |

Having described the invention with particular reference to precise examples thereof, it is to be understood that the invention is not limited to those examples, and that various modifications and changes may be made by one skilled in the art without departing from the scope or spirit of the invention.

What is claimed is:

1. An aqueous composition useful as a flame retardant and consisting essentially of (a) from about 10 to 60 percent by weight of a blend of an aqueous ammonium nitrate liquor and an aqueous urea liquor compounded so that the blend contains approximately 40–60% of the total nitrogen from each of said ammonium nitrate and urea and a total of about 28 to 32 percent nitrogen, and (b) from about 10 to about 50 percent of an aqueous ammoniated poly phosphate solution containing about 8–12 percent nitrogen and about 30–40 percent phosphoric acid.

2. The composition of claim 1 further consisting essentially of from about 0 to 25 percent of a member selected from the group consisting of molasses, starch, sugar and mixtures thereof.

3. The composition of claim 1 further consisting essentially of a strong base in an amount sufficient to raise the pH of the composition to about 6–8.

4. The composition of claim 2 further consisting essentially of a strong base in an amount sufficient to raise the pH of the composition to about 6–8.

5. The method of producing a flame retardant cellulose insulation material comprising the steps of mixing together a cellulose insulation material and a flame retardant composition consisting essentially of (a) from about 10 to 60 percent by weight of a blend of an aqueous ammonium nitrate liquor and an aqueous urea liquor compounded so that the blend contains approximately 40-60% of the total nitrogen from each of said ammonium nitrate and urea and a total of about 28 to 32 percent nitrogen, and (b) from about 10 to about 50 percent of an aqueous ammoniated poly phosphate solution containing about 8–12 percent nitrogen and about 30–40 percent phosphoric acid.

6. The method of claim 5 where said flame retardant composition further consists essentially of from about 0 to 25 percent of a member selected from the group consisting of molasses, starch, sugar and mixtures thereof.

7. The method of claim 5 wherein the flame retardant composition further consists essentially of a strong base in an amount sufficient to raise the pH of the composition to about 6–8.

8. A flame retardant insulation material formed by the mixing of constituents comprising (a) a cellulose material selected from the group consisting of ground newsprint, shredded wood fiber, straw, cotton batting or mixtures thereof and (b) a flame retardant composition consisting essentially of (i) from about 10 to 60 percent by weight of a blend of an aqueous ammonium nitrate liquor and an aqueous urea liquor compounded so that the blend contains approximately 40-60 percent of the total nitrogen from each of said ammonium nitrate and urea and a total of about 28 to 32 percent nitrogen, and (ii) from about 10 to about 50 percent of an aqueous ammoniated poly phosphate solution containing about 8-12 percent nitrogen and about 30-40 percent phosphoric acid, said flame retardant comprising about 10 to about 40 percent of the total mixture.

9. The insulation material of claim 8, wherein said flame retardant further consists essentially of from about 0 to 25 percent of a member selected from the group consisting of molasses, starch, sugar and mixtures thereof.

10. The insulation material of claim 8, wherein said flame retardant further consists essentially of a strong base in an amount sufficient to raise the pH of the composition to about 6–8.

11. The insulation material of claim 9, wherein said flame retardant further consists essentially of a strong base in an amount sufficient to raise the pH of the composition to about 6–8.

* * * * *